US012793214B2

(12) United States Patent
Liao et al.

(10) Patent No.: US 12,793,214 B2
(45) Date of Patent: Nov. 10, 2026

(54) METHOD AND APPARATUS FOR DETERMINING ARTICLE ACTING ON FACE, AND DEVICE AND MEDIUM

(71) Applicant: Beijing Bytedance Network Technology Co., Ltd., Beijing (CN)

(72) Inventors: Yanbing Liao, Beijing (CN); Qianqian Wang, Beijing (CN); Yuping Duan, Beijing (CN); Wentong Zou, Beijing (CN); Gaorong Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 328 days.

(21) Appl. No.: 18/571,026

(22) PCT Filed: Oct. 13, 2022

(86) PCT No.: PCT/CN2022/125034
§ 371 (c)(1),
(2) Date: Dec. 15, 2023

(87) PCT Pub. No.: WO2023/061429
PCT Pub. Date: Apr. 20, 2023

(65) Prior Publication Data

US 2024/0193773 A1 Jun. 13, 2024

(30) Foreign Application Priority Data

Oct. 14, 2021 (CN) .......................... 202111197816.4

(51) Int. Cl.
*G06K 9/00* (2022.01)
*G06Q 30/0601* (2023.01)
(Continued)

(52) U.S. Cl.
CPC ....... *G06T 7/0012* (2013.01); *G06Q 30/0631* (2013.01); *G06T 7/90* (2017.01);
(Continued)

(58) Field of Classification Search
CPC .................................. G06K 9/00; G06T 7/00
(Continued)

(56) References Cited

U.S. PATENT DOCUMENTS 12,073,418 B2 * 8/2024 Harvill ................. G06V 40/161
2021/0315512 A1 * 10/2021 Depfenhart ............ G16H 50/30
(Continued)

FOREIGN PATENT DOCUMENTS

CN 106952143 A 7/2017
CN 108198043 A 6/2018
(Continued)

OTHER PUBLICATIONS

Office Action for Chinese Patent Application No. 202111197816.4, mailed on Apr. 1, 2026, 20 pages.

*Primary Examiner* — Seyed H Azarian
(74) *Attorney, Agent, or Firm* — Astute IP Law Group

(57) ABSTRACT

The present disclosure relates to a method and apparatus for determining an article acting on a face, and a device and a medium. The method includes: on the basis of a facial image of a user, determining target attribute information of the user in each skin attribute dimension; and displaying a target article combination, which is adapted to the user, wherein the target article combination is determined on the basis of each piece of target attribute information and a mapping relationship between an attribute value level of each skin attribute dimension and a candidate article combination, the article combination includes a plurality of articles that act on a face, and an article category to which one article belongs is different from that of another.

16 Claims, 5 Drawing Sheets

(51) Int. Cl.
*G06T 7/00* (2017.01)
*G06T 7/90* (2017.01)
*G06V 40/16* (2022.01)

(52) U.S. Cl.
CPC .. *G06V 40/171* (2022.01); *G06T 2207/30088* (2013.01); *G06T 2207/30201* (2013.01); *G06T 2207/30242* (2013.01)

(58) Field of Classification Search
USPC ....... 382/100, 103, 108, 115, 128, 156, 168, 382/173, 181, 254, 276, 305, 312; 703/11; 705/26.7
See application file for complete search history.

(56) References Cited

U.S. PATENT DOCUMENTS

| | | | | |
|---|---|---|---|---|
| 2023/0177587 | A1* | 6/2023 | Tendulkar | G06V 10/774 705/26.7 |
| 2023/0253069 | A1* | 8/2023 | Tran | C12Q 1/6869 703/11 |
| 2023/0419332 | A1* | 12/2023 | Harvill | G06Q 30/0641 |
| 2024/0079012 | A1* | 3/2024 | Maizels | G06F 21/32 |
| 2024/0082134 | A1* | 3/2024 | Mandla | A61Q 19/00 |

FOREIGN PATENT DOCUMENTS

| | | | |
|---|---|---|---|
| CN | 108335727 | A | 7/2018 |
| CN | 108354587 | A | 8/2018 |
| CN | 109527779 | A | 3/2019 |
| CN | 109784281 | A | 5/2019 |
| CN | 111161007 | A | 5/2020 |
| JP | 2005308472 | A | 11/2005 |
| KR | 10-2157050 | B1 | 9/2020 |
| WO | 2021/079468 | A1 | 4/2021 |

* cited by examiner

METHOD AND APPARATUS FOR DETERMINING ARTICLE ACTING ON FACE, AND DEVICE AND MEDIUM

CROSS REFERENCES TO RELATED APPLICATIONS

This application is a U.S. National Stage based on International Patent Application No. PCT/CN2022/125034, filed on Oct. 13, 2022, which claims the priority of Chinese Patent Application No. 202111197816.4, filed in China Patent Office on Oct. 14, 2021, the entire contents of which are incorporated into this application by reference in their entireties.

TECHNICAL FIELD

The invention relates to the technical field of computers, and in particular, relates to a method, apparatus, device and medium for determining articles acting on a face.

BACKGROUND

With the improvement of people's quality of life, more and more people begin to pay attention to skin care, and the most important concern is the selection of skin care products and cosmetics that act on a face.

At present, the main ways to choose the articles that act on the face are: (1) to choose through the recommendation of friends, shopping guides, anchors, etc.: (2) to choose by users according to the heat of the articles acting on the face: (3) to obtain and analyze their own skin condition by the users through skin care-related applications, and choose from the list of articles of a certain category (such as skin care water, skin care essence, etc.) recommended by the application according to the analysis results.

However, none of the above-mentioned methods for selecting articles acting on the face can determine combined articles acting on the face suitable for the users, but the users need to find combined articles themselves, which undoubtedly increases the difficulty of selecting articles for the users and reduces selection efficiency of articles acting on the face and adaptation accuracy of the selected article combination with the skin condition of users.

SUMMARY

In order to solve the above technical problems or at least partially solve the above technical problems, the present disclosure provides a method, apparatus, device and medium for determining articles acting on a face.

In a first aspect, the present disclosure provides a method for determining articles acting on a face, the method including:

determining target attribute information of a user in respective skin attribute dimensions based on a face image of the user; and displaying a target article combination adapted to the user; wherein, the target article combination is determined based on the respective target attribute information and a mapping relationship between attribute value levels of the respective skin attribute dimensions and candidate article combinations: wherein the article combination includes a plurality of articles acting on the face, and each article belongs to a different article category.

In a second aspect, the present disclosure also provides another method for determining articles acting on a face, which includes:

determining target attribute information of a user in respective skin attribute dimensions corresponding to a face image of the user; and determining a target article combination suitable for the user based on the respective target attribute information and a mapping relationship between attribute value levels of the respective skin attribute dimensions and candidate article combinations: wherein, the article combination includes a plurality of articles acting on the face, and each article belongs to a different article category.

In a third aspect, the present disclosure also provides an apparatus for determining articles acting on a face, which includes:

a first target attribute information determining module, configured to determine target attribute information of a user in respective skin attribute dimensions based on a face image of the user; and a target article combination display module, configured to display a target article combination adapted to the user: wherein, the target article combination is determined based on the respective target attribute information and a mapping relationship between attribute value levels of the respective skin attribute dimensions and candidate article combinations: and the article combination includes a plurality of articles acting on the face, and each article belongs to a different article category.

In a fourth aspect, the present disclosure also provides another apparatus for determining articles acting on a face, which includes:

a second target attribute information determining module, configured to determine target attribute information of a user in respective skin attribute dimensions corresponding to a face image of the user: and a target article combination determining module, configured to determine a target article combination suitable for the user based on the respective target attribute information and a mapping relationship between attribute value levels of the respective skin attribute dimensions and candidate article combinations: wherein, the article combination includes a plurality of articles acting on the face, and each article belongs to a different article category.

In a fifth aspect, the present disclosure provides an electronic device, including:

a processor;

a memory for storing executable instructions: and wherein, the processor is configured to read the executable instructions from the memory and executing the executable instructions to realize the method for determining the articles acting on the face described in any embodiment of the present disclosure.

In a fourth aspect, the present disclosure provides a computer-readable storage medium storing a computer program thereon, which, when executed by a processor, causes the processor to realize the method for determining articles acting on a face described in any embodiment of the present disclosure.

In a fifth aspect, the present disclosure provides a computer program product, which includes computer programs/instructions that, when executed by a processor, realize the method for determining articles acting on a face described in any embodiment of the present disclosure. The method, apparatus, device and medium for determining the articles acting on the face of the embodiment of the present disclosure can determine target attribute information of a user in respective skin attribute dimensions according to a face image of the user, and display a target article combination which is determined based on the respective target attribute information and a mapping relationship between attribute value levels of respective skin attribute dimensions and candidate article combinations and is adapted to the user, and the article combination contains a plurality of articles acting on the face, and each article belongs to a different article category, so that the user does not need to combine various articles acting on the face by himself/herself, but the users can be directly recommended an appropriate combination of articles for the face according to the skin condition of the users, which not only greatly reduces the difficulty for the users to select articles acting on the face, and improves selection efficiency of the article combination, but also improves adaptation accuracy of the article combination with the skin condition of the user.

BRIEF DESCRIPTION OF THE DRAWINGS

The above and other features, advantages and aspects of embodiments of the present disclosure will become more apparent by referring to the following detailed description in combination with the accompanying drawings. Throughout the drawings, the same or similar reference numerals indicate the same or similar elements. It should be understood that the drawings are schematic, and originals and elements are not necessarily drawn proportionally.

DETAILED DESCRIPTION

Figure 1:
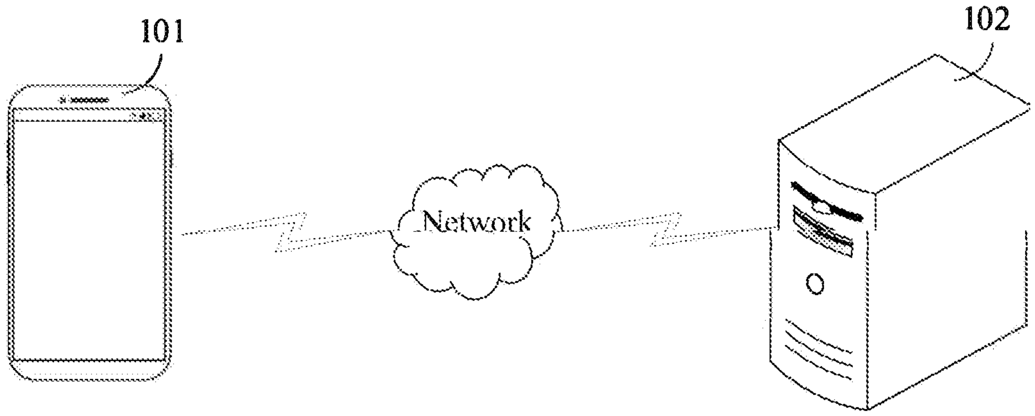
FIG. 1 is an application scenario diagram of a method for determining articles acting on a face provided by an embodiment of the present disclosure.

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

As used herein, the term “including” and its variants are open including, that is, “including but not limited to.” The term “based on” is “at least partially based on.” The term “one embodiment” means “at least one embodiment;” the term “another embodiment” means “at least one other embodiment;” the term “some embodiments” means “at least some embodiments.” Related definitions of other terms will be given in the following description.

It should be noted that the concepts of “first” and “second” mentioned in this disclosure are only used to distinguish different apparatuses, modules or units, and are not used to limit the order or interdependence of the functions performed by these apparatuses, modules or units.

It should be noted that the modifications of “one” and “a plurality” mentioned in this disclosure are schematic rather than limiting, and those skilled in the art should understand that unless the context clearly indicates otherwise, they should be understood as “one or more.”

Names of messages or information exchanged among multiple apparatuses in the embodiment of the present disclosure are only used for illustrative purposes, and are not used to limit the scope of these messages or information.

At present, when users select articles that act on the face (hereinafter referred to as “articles” for short, such as skin care products, cosmetics, etc.), whether they choose articles recommended by others or those recommended by skin care-related applications based on the user’s skin condition, they all choose an article from a plurality of article list corresponding to a single article category (such as an eye cream, skin care water, a skin care essence, a cream, etc.). If users want to select an article combination, they can only combine articles themselves from the article list corresponding to multiple article categories, which undoubtedly increases a difficulty of selecting articles for users and reduces efficiency of selecting articles for users.

Moreover, there are overlapping, complementary or mutually exclusive effects between the articles acting on the face, and combination effects of different articles may be different. A good combination of articles can achieve the effect of 1+1>2, and a bad combination of articles may cause the effect of 1+1<2. For example, a moisturizing skin care water, a skin care essence and a cream, which are also suitable for dry skin, if used together, are likely to lead to poor absorption effect of all skin care products, and products will ball up on the face, which is not conducive to the subsequent use of makeup. Therefore, the combination of articles formed by the users’ self-selection is likely to reduce adaptation accuracy between articles and the users’ skin, failing to achieve better skin care effect.

Based on the above situation, the embodiment of the application provides a scheme for determining the articles acting on the face, so as to automatically recommend the article combination adapted to the user according to the skin condition of the user, reduce the difficulty of selecting articles by the user, improve the efficiency of selecting articles by the user, and improve the adaptation accuracy between the article combination and the skin of the user.

FIG. 1 is an application scenario diagram of a method for determining articles acting on a face provided by an embodiment of the present disclosure. As shown in FIG. 1, the application scenario includes a user client 101 and a server 102, and the user client 101 and the server 102 communicate with each other through a network. The user client 101 obtains at least the face image of the user and the target article combination fed back by the display server 102, and the server 102 determines a target article combination at least according to target attribute information on respective skin attribute dimensions corresponding to a face image and a mapping relationship between attribute value levels of the respective skin attribute dimensions and candidate article combinations.

Herein the user client 101 may be an electronic device with the function of obtaining the face image of the user and displaying information. For example, the user client 101 includes but is not limited to a smart phone, a tablet computer PAD, a personal digital assistant PDA, a vehicle-mounted terminal (such as a vehicle navigation terminal), a wearable device, a notebook computer, a desktop computer and the like. The server 102 is an electronic device with strong data processing capability. For example, the server 102 includes but is not limited to a notebook computer, a desktop computer, a server, etc. The server can be realized by an independent server or a server cluster composed of multiple servers.

First, with reference to FIG. 2-FIG. 5, the method for determining the articles acting on the face provided by the embodiment of the present disclosure will be described below.

In the embodiment of the present disclosure, the method for determining the articles acting on the face can be performed by a determining apparatus for determining the articles acting on the face, which can be realized by software and/or hardware, and which can be integrated in an electronic device.

Figure 2:
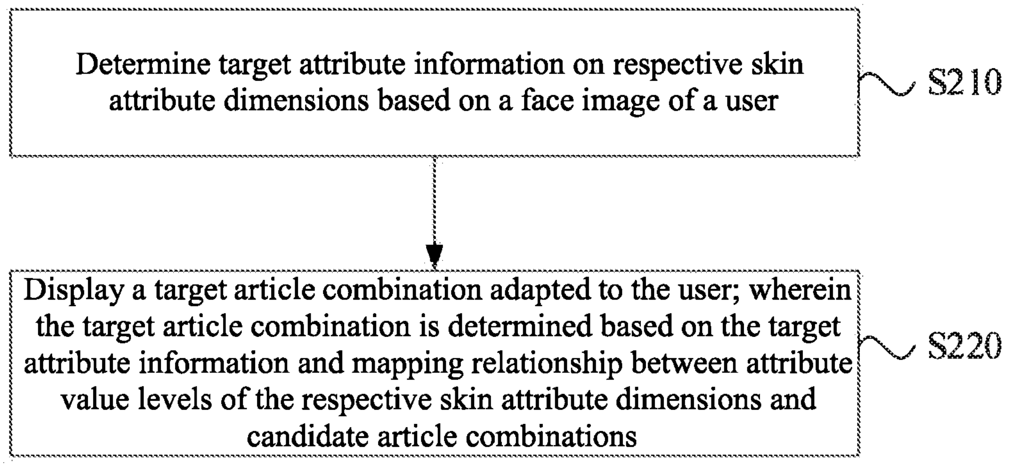
FIG. 2 is a flowchart of a method for determining the articles acting on the face provided by an embodiment of the present disclosure.

FIG. 2 shows a flowchart of a method for determining articles acting on a face provided by an embodiment of the present disclosure. The method for determining the articles acting on the face is applied to a user client 101 in FIG. 1, so the electronic devices in this embodiment and related embodiments are the corresponding electronic devices of the user client 101. As shown in FIG. 2, the method for determining the articles acting on the face may include the following steps:

S210: Target attribute information of a user in respective skin attribute dimensions is determined based on a face image of the user.

Herein the face image refers to an image containing a face region of a person. The face image needs to clearly reflect facial features of the person. In order to improve evaluation accuracy of the user's skin condition, the face image may be an image that only contains a head region of a person and reflects the facial features of the person, and image resolution meets certain requirements, so that more image pixels can be used to display the face region and provide more detailed features of the face.

Skin attribute dimensions refer to attribute dimensions reflecting the skin state, which can reflect skin moisture content, wrinkle amount, oil yield, whiteness, dark circles, smoothness and so on, and may be set according to the accuracy of skin evaluation in business requirements. In some embodiments, the skin attribute dimensions include a skin smoothness dimension, a skin delicacy dimension, a skin color uniformity dimension and a skin elasticity dimension. The skin smoothness dimension is an attribute dimension reflecting the smoothness of skin, which can be measured by the number of acne, acne marks, spots, moles, blackheads, etc. on the skin that affect skin smoothness in the image. The skin delicacy dimension is an attribute dimension that reflects the degree of skin fineness and moisture, which can be measured by the thickness of skin pores and the number of the blackheads in the image. The skin color uniformity dimension is an attribute dimension that reflects whether the overall skin color is symmetrical, which can be measured by the chromaticity difference between the overall skin colors in the image. The skin elasticity dimension is an attribute dimension that reflects the elasticity of facial skin and whether facial muscles are slack and drooping, which can be measured by the size and number of the wrinkles on the skin in the image. Through the setting of the above four skin attribute dimensions, the basic state of the skin as a whole from the angles of smoothness, tenderness, uniformity and compactness can be reflected.

The target attribute information refers to attribute information on each skin attribute dimension corresponding to the face image. The attribute information may be an evaluation value of a certain skin attribute dimension, such as a specific score of 98 in a percentile system: it may also be an evaluation numerical range or evaluation level in a certain skin attribute dimension. For example, the skin smoothness dimension corresponds to five evaluation levels from "completely not uniform" to "completely smooth," and the attribute information is the specific evaluation level value, such as the third level.

Specifically, when the user wants to obtain the combination recommendation of the articles acting on the face, the user can trigger related controls displayed by the electronic device, such as a "skin quality evaluation" control or a "skin care product recommendation" control, etc., so as to trigger the electronic device to perform the article determination process in the embodiment of the present disclosure. After the electronic device detects the trigger operation of the above control, it obtains the user's face image, for example, it may collect the face image through a camera, or it may read the face image stored in the storage medium, or it may obtain the user's face image from the server through the network. Then, the electronic device determines the target attribute information of the user's face skin in respective skin attribute dimensions according to the face image.

In some embodiments, the process of determining the respective target attribute information may be performed in the electronic device. In this case, relevant algorithm of the skin quality evaluation is called by the electronic device to obtain the above respective target attribute information. In other embodiments, the process of determining respective target attribute information may be performed in the server. In this case, the electronic device may send the face image to the server. The related algorithm of skin quality evaluation is called by the server to obtain the above respective target attribute information. Then, each obtained target attribute information is sent by the server to the electronic device.

In some embodiments, after S110, the method for determining the articles acting on the face further includes the following steps: the respective skin attribute dimensions and the target attribute information of the corresponding skin attribute dimension are displayed.

Figure 3:
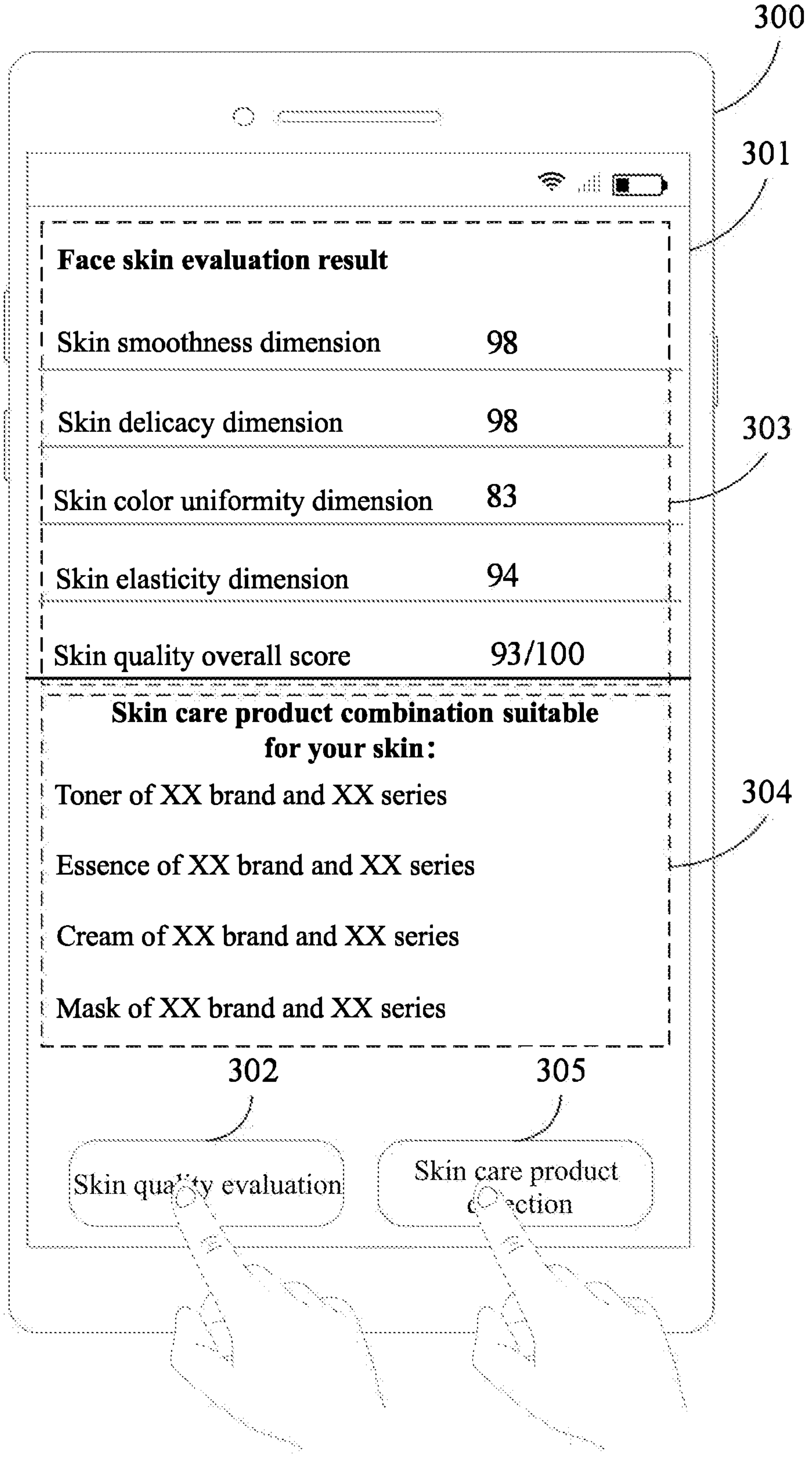
FIG. 3 is a schematic diagram of an article determination result display interface provided by an embodiment of the present disclosure.

Specifically, the user's demand is not only to get the recommended combination of articles, but also to know the user's own skin condition. Therefore, after the target attribute information of the user's facial skin in respective skin attribute dimensions is obtained, the electronic device may also display the respective skin attribute dimensions and their corresponding target attribute information on the display screen of the electronic device for the user to view:

FIG. 3 shows a schematic diagram of an article determination result display interface provided by an embodiment of the present disclosure. As shown in FIG. 3, an article determination result display interface 301 is displayed in the electronic device 300, and at least a "skin quality evaluation" control 302 is displayed in the article determination result display interface 301. The user may click on the "skin quality evaluation" control 302, and then the operation of S210 is performed by the electronic device 300 to obtain respective target attribute information. After that, the above-mentioned skin attribute dimensions and their corresponding target attribute information (specific scores of the target attribute information are exemplified in FIG. 3), i.e., the facial skin evaluation results, are displayed by the electronic device 300 in an upper region 303 of the article determination result display interface 301.

It should be noted that the upper region 303 is only one example, and the display position of the facial skin evaluation result in the article determination result display interface 301 is not limited.

S220: The target article combination adapted to the user is displayed: herein the target article combination is determined based on the target attribute information and the mapping relationship between the attribute value levels of respective skin attribute dimensions and the candidate article combinations.

Herein the article combination includes a plurality of articles acting on the face, and each article belongs to a different article category. That is, the article categories to which the respective articles contained in the article combination in the embodiment of the present disclosure belongs are not repetitive. The article category refers to a category of an article acting on the face, which is classified according to a rule such as usage of the article and parts of face region on which the article acts, such as skin care water, eye cream, face cream, facial mask, sunscreen cream, liquid foundation and so on. The attribute value level is an evaluation level designated for each skin attribute dimension according to the evaluation score range.

A candidate article combination refers to an article combination of respective article categories obtained in advance. In some embodiments, the candidate article combinations may be preset by skin care experts, i.e., the articles contained in each candidate article combination are manually set, in which case the article categories in the candidate article combinations are also manually set. In this way, a plurality of candidate article combinations with good combining effect among articles may be obtained. In other embodiments, the candidate article combination may be obtained by automatic matching according to the skin attribute dimension (i.e., labeled attribute information) suitable for each article and the respective attribute value levels, in which case the candidate article combination is determined according to the article categories of the articles that successfully matches the respective attribute value levels. In this way, more articles may be covered, more candidate article combinations may be generated, thus saving manpower. Details of the candidate article combinations obtained by the above automatic matching may be found in the description of subsequent embodiments.

Specifically, the server performs the determination process of the target article combination. The mapping relationship between the attribute value levels of the respective skin attribute dimensions and the candidate article combinations is established in the server in advance, so that the attribute value levels corresponding to each candidate article combination may be obtained. Then, after the target attribute information is received by the server, the server may determine the corresponding attribute value levels (namely, target attribute value levels) according to these target attribute information, and then query the above mapping relationship according to these target attribute value levels, so as to obtain the target article combination suitable for the user's skin condition. Then, the target article combination is sent by the server to the electronic device. The target article combination is displayed by the electronic device to the user through its display screen.

With continued reference to FIG. 3, the electronic device 300 also displays the target article combination in another display region of the article determination result display interface 301 (the lower region 304 of the interface is exemplified in FIG. 3). The target article combination in FIG. 3 is an example of a skin care product combination, which includes a toner, an essence, a cream and a mask.

Through the technical scheme in the embodiment of the present disclosure, the user's target attribute information in the respective skin attribute dimensions may be determined according to the face image of the user, and the target article combination adapted to the user determined based on the target attribute information and the mapping relationship between the attribute value levels of the respective skin attribute dimensions and the candidate article combinations may be displayed, and the article combination contains a plurality of articles acting on the face, and each article belongs to a different article category. Therefore, the user does not need to combine various articles acting on the face by himself/herself, but the appropriate combination of articles for the face is directly recommended according to the user's skin condition, which not only greatly reduces the difficulty for the user to select articles acting on the face, and improves the selection efficiency of the article combination, but also improves the adaptation accuracy of the article combination with the user's skin condition.

In some embodiments, the above-mentioned function of determining the user's target attribute information in various skin attribute dimensions may be implemented in the user client 101 in FIG. 1. In this way, the skin quality evaluation is carried out in the user client, and the target attribute information is directly obtained, which is used as communication information between the user client and the server, so that the communication information may be reduced and the communication speed may be improved, so that the skin quality evaluation and the recommendation of the article combination may still be carried out in the place with poor network quality, and the success rate and speed of the skin quality evaluation and the article combination determination may be improved.

In an example, when the skin attribute dimension is the skin smoothness dimension, S110 includes the following steps: the face image is input into a spot-acne-and-nevus detection model and a blackhead detection model respectively, and a number of spot-acne-and-nevus and the number of the blackheads is determined corresponding to users: and based on the number of spot-acne-and-nevus and the number of the blackheads, the target attribute information corresponding to the skin smoothness dimension is determined.

Herein the spot-acne-and-nevus detection model is a model for detecting spots, pox, acne marks, nevus, etc. in the face image, which may be obtained by model training related algorithms of image segmentation. The blackhead detection model is a model for detecting blackheads in the face image. It may be a model in the related art, or it may be based on the Generative Adversarial Network (GAN) to remove blackheads in face images, and then the face images before and after blackheads removal are compared to determine the blackheads in face images.

Specifically, in the embodiment of the present disclosure, the number of spots, pox, moles and blackheads existing in the face image is used to evaluate the skin smoothness dimension. The face image is input by the electronic device into the spot-acne-and-nevus detection model to obtain the number of spot-acne-and-nevus in the face image. The face image is input by the electronic device into the blackhead detection model. A blackhead-removed face image will first be output by blackhead detection model, then an image difference between the blackhead-removed face image and the input face image is calculated, and the obtained difference region is the blackhead region, and then the number of the blackheads is obtained from the blackhead region.

After that, the electronic device has a negative correlation between the number of the spot-acne-and-nevus and the number of the blackheads and an evaluation score of the skin smoothness dimension, i.e., the more the spot-acne-and-nevus and the blackheads are, the lower the evaluation score corresponding to the skin smoothness dimension is, and the target attribute information of the skin smoothness dimension is calculated from the number of the spot-acne-and-nevus and the number of the blackheads.

In another example, when the skin attribute dimension is the skin delicacy dimension, S110 includes the following steps: the face image is input into the blackhead detection model, the number of the blackheads corresponding to the user is determined, and the target attribute information corresponding to the skin delicacy dimension is determined based on the number of the blackheads.

Specifically, in this example, the blackhead detection is used instead of a pore detection to reflect the delicacy of skin. The face image is input by the electronic device into the blackhead detection model to obtain the number of the blackheads in the face image. Then, according to the negative correlation between the number of the blackheads and the degree of skin delicacy, i.e., the more blackheads are, the lower the evaluation score corresponding to the skin delicacy dimension is, and the target attribute information corresponding to the skin delicacy dimension is calculated from the number of the blackheads.

In another example, when the skin attribute dimension is the skin color uniformity dimension, S110 includes the following steps: inputting the face image into the skin color detection model to obtain a skin color difference region in the face image: and based on an area of the skin color difference region and a difference between pixel values of the skin color difference region in the face image and pixel values of other image regions other than the skin color difference region in the face image, the target attribute information corresponding to the skin color uniformity dimension is determined.

Herein, the skin color detection model is used to detect an un-uniform degree of skin color in the face image, which may directly output the skin color difference region (i.e., the skin color un-uniform region), or it may be used to skin-smooth the face image based on the GAN network, and then the face images before and after skin-smoothing are compared to determine the skin color difference region.

Specifically, the electronic device inputs the face image into the skin color detection model, and in the model operation process, it will first output a color-uniform face image, and then calculate the image difference between the color-uniform face image and the input face image, and the obtained difference region is a skin color difference region. Then, the electronic device calculates an area of the skin color difference region, and calculates a difference value between the skin color difference region and the skin color uniform region (i.e., other image regions other than the skin color difference region in the face image). Then, the electronic device calculates the target attribute information corresponding to the skin color uniformity dimension according to the area of the skin color difference region and the difference value of the skin color difference region. The larger the area and difference value of the skin color difference region are, the lower the evaluation score corresponding to the skin color uniformity dimension is.

In some embodiments, the calculation of the difference value may be to obtain statistical values (such as mean value, median value, maximum value, minimum value, etc.) of the respective pixel values with high appearing frequency in the skin color difference region and the skin color uniform region respectively according to the pixel value distribution of the two regions, and then calculate the difference value between the two regions by using the two statistical values, so as to improve calculation accuracy of the difference value. In other embodiments, the calculation of the difference value may also be to directly calculate the corresponding statistical value by using the pixel values of the skin color difference region and the skin color uniform region, and then calculate a difference value between the two regions by using the two statistical values, so as to improve the calculation speed to a certain extent.

In another example, when the skin attribute dimension is the skin elasticity dimension, S110 includes the following steps: feature points are extracted from the face image to obtain face key points in the face image: an eye region, a forehead region and a mouth region are determined in the face image based on key points of the face, and the number of the wrinkles in the face image is determined based on gradient information of pixel values of the eye region, the forehead region and the mouth region: and the target attribute information corresponding to the skin elasticity dimension is determined based on the number of the wrinkles.

Specifically, considering that facial wrinkles may reflect skin slackness to a certain extent, in this example, the evaluation score corresponding to the skin elasticity dimension is calculated by detecting the number of the wrinkles in the face image. The electronic device first extracts the feature points from the face image to obtain the face key points. Then, according to the key points of the face, the eye region, forehead region and mouth region are determined from the face image, because these regions are the most prone to produce wrinkles in the face. Then, according to the pixel value gradient information of the eye region, the forehead region and the mouth region, and a preset gradient threshold to judge a wrinkle, based on the fact that the pixel value gradient information is greater than the gradient threshold, a small region corresponding to the pixel value gradient information is considered as one wrinkle, and the number of the wrinkles in the above regions is determined, i.e., the number of the wrinkles in the face image is determined. Then, according to the relationship that the more the wrinkles are, the lower the evaluation score corresponding to the skin elasticity dimension is, and the target attribute information corresponding to the skin elasticity dimension is calculated.

In some embodiments, after S110, the method for determining the articles acting on the face further includes the following steps: in response to an article detection trigger operation of the user, the article information of the articles to be detected is obtained: the article information of the article to be detected and an article detection result about whether the article to be detected is suitable for the user are displayed: and the article detection result is determined based on the labeled attribute information of the respective skin attribute dimensions corresponding to the article information and the target attribute information of the corresponding skin attribute dimension.

Herein, the article detection trigger operation is an operation to trigger the detection of an articles acting on the face, which may be generated by, for example, triggering a control with related functions displayed in an electronic device. The trigger operation here may be a contact trigger operation such as clicking and touching, or a non-contact trigger operation such as voice control and eye movement control. The article information refers to the related information of the article to be detected, such as article name, brand, efficacy description, usage method, etc.

Specifically, in the related art, when an article to be detected is identified, a component list corresponding to the article to be detected is often provided. However, most users don't understand the functions and efficacy of various ingredients in an ingredient list, so they can't judge whether the article to be detected is suitable for the users themselves. Based on this, the embodiment of the present disclosure provides a new article detection function, so that a user may intuitively know whether the article to be detected is suitable for the user's skin, thus providing reference for the user to select the article to be detected, further improving the efficiency and accuracy of article selection and the matching degree between the selected article and the user's skin.

In specific implementation, the electronic device may provide related functional controls that trigger the detection of the article, such as a control for selecting an article photo, a control for taking an article photo, an input control for inputting article information, or a "skin care product detection" control 305 as shown in the article determination result display interface 301 in FIG. 3. The user may trigger the functional control to generate the article detection trigger operation. After receiving the article detection trigger operation, the electronic device obtains the article image of the article to be detected, such as starting a camera to capture an article image or reading the article image from a storage medium. Or, after receiving the article detection trigger operation, the electronic device directly receives the article information of the article to be detected input by the user. After that, the electronic device sends the article image or article information to the server.

A content of the article image is identified by the server to obtain the article information of the article to be detected. Then, a labeling attribute tag of the article to be detected is determined by the server based on the article information, and it is judged whether the article to be detected is suitable for the user's skin according to the labeling attribute tag and the above-mentioned target attribute information to obtain the article detection result. After that, the article information and the article detection result are fed back by the server to the electronic device. The received article information and the article detection result are displayed by the electronic device. The content of the product detection result generated by the server may be found in the description of the subsequent embodiments.

Figure 4:
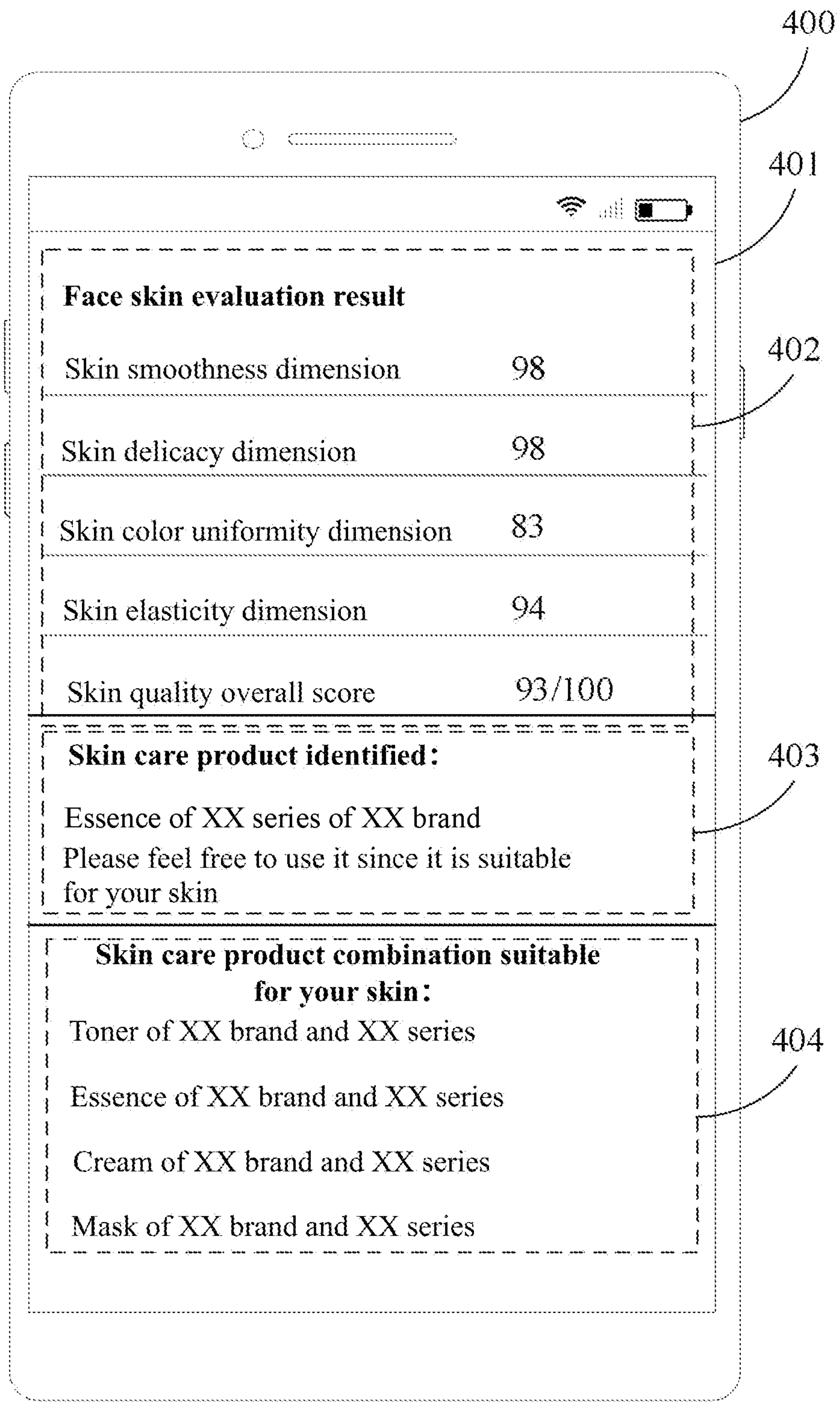
FIG. 4 is a schematic diagram of another article determination result display interface provided by the embodiment of the present disclosure.

Referring to FIG. 3, after the user clicks the "skin care product detection" control 305 shown in FIG. 3, the article information and the article detection result may be displayed by the electronic device, and the display effect is shown in FIG. 4. In FIG. 4, an article determination result display interface 401 is displayed in the electronic device 400, in which the skin attribute dimensions corresponding to the face image and their corresponding target attribute information are displayed in an upper region 402, in which the article information "Essence of XX series of XX brand" and the article detection result "Please feel free to use it since it is suitable for your skin" are displayed in a middle region 403, and the target article combination is displayed in a lower region 404.

It should be noted that the upper area 402, the middle area 403 and the lower area 404 in FIG. 4 are only examples, and their position range, area size and display contents in the regions are not limited, so it is only necessary to ensure that the above three parts of information are displayed in the display interface 401 for displaying the article determination results.

Figure 5:
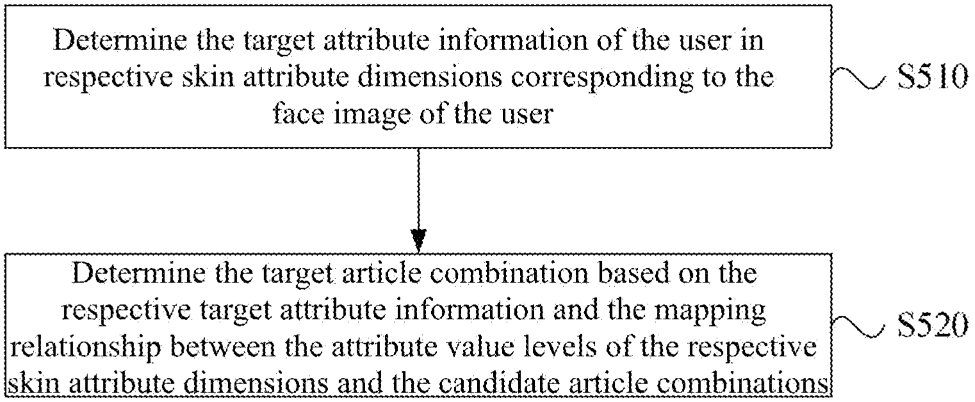
FIG. 5 is a flowchart of another method for determining the articles acting on the face provided by an embodiment of the present disclosure.

FIG. 5 shows a flowchart of another method for determining the articles acting on the face provided by an embodiment of the present disclosure. The method for determining the articles acting on the face is applied to the server 102 in FIG. 1, so the electronic devices in this embodiment and related embodiments are the corresponding electronic devices of the server 102. As shown in FIG. 5, the method for determining the articles acting on the face may include the following steps:

S510: The target attribute information of the user in respective skin attribute dimensions corresponding to the face image of the user is determined.

Specifically, the electronic device may periodically query a user client to obtain the face image and/or the target attribute information on respective skin attribute dimensions corresponding to the face image. The electronic device may also receive the face image sent by the user client and/or the target attribute information in respective skin attribute dimensions corresponding to the face image.

S520: Based on the target attribute information and the mapping relationship between the attribute value levels of the respective skin attribute dimensions and the candidate article combinations, the target article combination suitable for the user is determined.

Specifically, the mapping relationship between the attribute value levels of the respective skin attribute dimensions and the candidate article combinations is pre-established in the server. For example, the electronic device arranges and combines a plurality of attribute value levels corresponding to each skin attribute dimension to obtain a plurality of attribute value level combinations, and each attribute value level contained in the attribute value level combinations corresponds to a non-repetitive skin attribute dimension. For example, for the four skin attribute dimensions mentioned above, namely, the skin smoothness dimension (referred to as smoothness), the skin delicacy dimension (referred to as delicacy), the skin color uniformity dimension (referred to as uniformity) and the skin elasticity dimension (referred to as compactness), there are 16 corresponding attribute value level combinations according to the division of each skin attribute dimension into two attribute value levels (yes/no), and some examples are: (smooth, fineness, uniformity and compact) and (unsmooth, delicacy, uniformity, compactness). Then, the electronic device determines at least one candidate article combination for each attribute value level combination. According to the above description, the candidate article combination may be set manually or determined by automatic machine matching. In this way, the above-mentioned mapping relationship of each attribute value level combination and its corresponding at least one candidate article combination may be obtained.

Then, after the respective target attribute information corresponding to the face image of the user is obtained, the electronic device may query the above mapping relationship based on the target attribute information, so as to screen out the target article combination from a plurality of candidate article combinations.

In some embodiments, S520 includes the following steps: a target attribute value level corresponding to each skin attribute dimension is determined based on the respective target attribute information: and based on the respective target attribute value levels, the mapping relationship is queried and the target article combination suitable for the user is screened out from the respective candidate article combinations.

Specifically, the electronic device first determines the target attribute value level corresponding to each target attribute information. When the target attribute information is the attribute value level, the target attribute information of each skin attribute dimension may be determined as the target attribute value level on the skin attribute dimension. When the target attribute information is a specific evaluation value, for each target attribute information, it is judged that the target attribute information is within a numerical range of which attribute value level of its corresponding skin attribute dimension, and the attribute value level in which it lies is determined as the target attribute value level corresponding to the target attribute information.

Then, the attribute value level combination in the mapping relationship is queried by the electronic device according to respective target attribute value levels to determine the attribute value level combination that completely matches each target attribute value level. Then, the candidate article combination corresponding to the attribute value level combination matched in the mapping relationship is determined by the electronic device as the target article combination.

In some embodiments, according to the above description, each attribute value level combination in the mapping relationship may correspond to at least one candidate article combination, so a strategy of screening out target candidate articles is different with different number of candidate article combinations.

In an example, each attribute value level combination may correspond to one candidate article combination, then the candidate article combination corresponding to the matched attribute value level combination may be directly determined as the target article combination. For example, in the case that the candidate article combination is artificially set by a dermatologist, in order to save manpower, only one candidate article combination may be set for each attribute value level combination.

In another example, each attribute value level combination corresponds to a plurality of candidate article combinations. In this case, the target article combination may be determined according to popularity of respective articles included in the candidate article combination. The popularity here may be determined according to a number of recommendations, browsing times, purchase times, etc. In this way, a target article combination with good feedback on the use of articles may be obtained, a collocation effect of the article combination may be improved, and the adaptation accuracy of the article combination with the skin condition of the user may be further improved.

In yet another example, each attribute value level combination corresponds to a plurality of candidate article combinations. In this case, querying the mapping relationship based on the respective target attribute values, and screening out the target article combination suitable for the user from the respective candidate article combinations may be realized as follows:

Step A: The mapping relation is queried based on the respective target attribute value level, and a plurality of target candidate article combinations corresponding to the respective target attribute value level are obtained.

Specifically, the mapping relationship is queried by the electronic device according to the respective target attribute value levels to obtain a matching attribute value level combination, and a plurality of candidate article combinations corresponding to the matching attribute value level combination are determined as the target candidate article combination.

These target candidate article combinations may be that the article categories contained in the article combinations are different, or that the article categories contained in the article combinations are the same, but the articles in at least one article category are different, such as different brands or different product series.

Step B: Based on article provider information of the respective article categories corresponding to the user, the target article combination is screened out from the respective target candidate article combinations.

Herein, the information of the article provider refers to a brand, producer and place of origin of the goods and other relevant information related to the article provider.

Specifically, when there are multiple target candidate article combinations, in order to improve fit between the final target article combination and the user's needs and further improve the adaptation accuracy between the target article combination and the user, the respective target candidate article combinations may be screened out according to the user's article selection tendency. Therefore, the electronic device may first obtain the article provider information of the user in each article category. For example, the user client may provide the user with an input function of the article provider information, so that the user may input the article provider information he/she likes to use/wants to know (such as brand, product series, etc.) in each article category, so that the electronic device may determine the article provider information of the user in each article category through the above information sent by the user client. For another example, the electronic device may extract the information of the user's article provider in the respective article categories from article purchase records/article browsing records authorized by the user.

Then, the article provider information of each article contained in the respective target candidate article combinations is matched by the electronic device according to the article provider information of the user in the respective article categories, and the target candidate article combination with the highest matching degree is determined as the target article combination.

Through the technical scheme of the above embodiment of the disclosure, the user's target attribute information in respective skin attribute dimensions may be determined according to the face image of the user, and the target article combination suitable for the user may be determined based on the target attribute information and the mapping relationship between the attribute value levels of the respective skin attribute dimensions and the candidate article combinations, and the article combination contains a plurality of articles acting on the face, and each article belongs to different article categories. Therefore, the user does not need to combine various articles acting on the face by himself/herself, but directly recommends the appropriate combination of articles for the face according to the user's skin condition, which not only greatly reduces the difficulty for the user to select articles acting on the face, improves the selection efficiency of the article combination, but also improves the adaptation accuracy of the article combination with the user's skin condition.

In some embodiment, according to the above description, the candidate article combination may be artificially set by a dermatologist. For example, for the attribute value level combination of the above example, the candidate article combinations may be: (smooth, fineness, uniform and compact): Article combination 1 set by experts: (not smooth, fine, uniform and compact): Article combination set by experts 2: (smooth, not fine, uniform and compact): Article combination 3 set by experts. In this way, a plurality of candidate article combinations with good matching effect among articles may be obtained, thereby further improving the adaptation accuracy of the article combinations with the skin condition of users.

In other embodiments, the candidate article combinations may be automatically matched by machines to cover more article categories and articles, generate more candidate article combinations, improve diversity of candidate article combinations, and save manpower. In these embodiments, candidate article combinations are predetermined by:

Step C: A plurality of attribute value level combinations corresponding to the respective skin attribute dimensions are determined based on the attribute value level of each skin attribute dimension.

Specifically, the attribute value levels of the respective skin attribute dimensions are arranged and combined to generate a plurality of attribute value level combinations.

Step D: For each article acting on the face, the labeled attribute information of the article in respective skin attribute dimensions is matched with each attribute value level combination to obtain the matching degree of the article and each attribute value level combination.

Herein the labeled attribute information refers to the skin attribute dimension of the skin which the article acting on the face applies to, and it may set a result of whether the article is suitable for the skin attribute dimension in any skin attribute dimension. For example, when an article is suitable for a certain skin attribute dimension, the labeled attribute information may be the lowest attribute value level of the article suitable for the skin attribute dimension, indicating that the article is suitable for the user's skin in the skin attribute dimension, when the attribute value level corresponding to the user's skin in the skin attribute dimension (i.e., the target attribute value level) is not lower than the lowest attribute value level; the labeled attribute information may also be identifying information, such as "universal," which represents all attribute values of the article suitable for the skin attribute dimension. When the article is not suitable for a certain skin attribute dimension or the article is not related to the skin attribute dimension, the labeled attribute information may be identifying information that states it is not suitable, such as "irrelevant."

Specifically, the labeled attribute information is set for each article involved in candidate article combination matching. Then, the labeled attribute information of a certain article is matched with each attribute value level combination to obtain the matching degree of the article and each attribute value level combination.

For example, the labeled attribute information of Article A is (smooth, universal, irrelevant and compact), and the labeled attribute information of Article B is (smooth, fine, uniform and compact). The attribute value level combinations are: Combination 1 (smooth, fine, uniform and compact), Combination 2 (not smooth, fine, uniform and compact) and Combination 3 (smooth, not uniform and compact). If the combination of labeled attribute information and attribute value level of a certain skin attribute dimension is consistent or not mutually exclusive, it may be determined that the two are matched in the skin attribute dimension, and it may be labeled with a matching value of 1; and if the labeled attribute information and attribute value level combination of a certain skin attribute dimension are mutually exclusive, then it may be determined that they do not match in the skin attribute dimension, and the matching value is 0.

Based on the above explanation, the matching results of Article A and the three attribute value level combinations are (1, 1, 0, 1), (0, 1, 0, 1) and (1, 0, 0, 0) respectively, and their corresponding matching degrees are 3, 2 and 1 respectively. The matching results of Article B and the combination of three attribute values are (1, 1, 1, 1), (0, 1, 1, 1) and (1, 0, 0, 1) respectively, and their corresponding matching degrees are 4, 3 and 2 respectively.

Step E: For each attribute value level combination, at least one candidate article combination corresponding to the attribute value level combination is determined based on the article category to which each article belongs and the matching degree between each article and the attribute value level combination.

Specifically, for any attribute value level combination, firstly, according to the matching degree between each article and the attribute value level combination, a plurality of articles with matching degree not less than a preset first matching degree threshold are screened out. Then, the screened out articles are classified according to the article category, and at least one article in each article category corresponding to the attribute value level combination may be obtained. For example, for a certain attribute value level combination, five articles of eye cream, six articles of skin care water, three articles of essence and four articles of face cream that meet the above requirements are obtained.

It may be understood that the above process may also be to classify all articles according to the article category, and then screen the articles contained in each article category according to the first matching threshold, and the above results may also be obtained.

Then, according to the principle of selecting one article from one article category, the above articles in the respective article categories are arranged and combined, and a plurality of candidate article combinations under the attribute value level combination may be obtained.

In still other embodiments, the respective candidate article combinations are generated based on predetermined basic article combinations.

Specifically, in this embodiment, on the basis of the candidate article combination set by the dermatologist (i.e., the basic article combination), the respective candidate article combinations may be obtained by automatic machine matching according to the above embodiment.

For example, for any article in a certain basic article combination (called basic article), the labeled attribute information of the basic article is matched with the labeled attribute information of the respective articles belonging to the same basic article category, and the matching degree of each article in this article category with the basic article is obtained. Then, according to the principle that the matching degree is not less than a preset second matching degree threshold, the articles (called candidate articles) are screened out from the articles in this article category.

According to the above process, a plurality of candidate articles corresponding to each article category in the basic article combination may be obtained. Then, according to the principle of selecting one article according to one article category, these candidate articles are arranged and combined, and a plurality of candidate article combinations corresponding to the basic article combination may be obtained.

According to the above-mentioned whole process, a plurality of candidate article combinations corresponding to each basic article combination may be obtained. These basic article combinations and the obtained candidate article combinations all get involved in a screening out process of the target article combinations as the candidate article combinations.

This arrangement may make the obtained candidate article combinations have the same good matching effect as the basic article combination, improve the adaptation accuracy of the target article combination with the user's skin, and obtain more candidate article combinations more quickly with the help of the automatic matching process of the machine, saving manpower consumption and further improving the determination efficiency and diversity of candidate article combinations.

In some embodiments, after S510, the method for determining the articles acting on the face further includes the following steps: the article information of the articles to be detected is determined: the labeled attribute information of respective skin attribute dimensions corresponding to the article to be detected is determined based on the article information: and based on the target attribute information and labeled attribute information corresponding to the respective skin attribute dimensions, an article detection result is generated whether the article to be detected is suitable for the user.

Specifically, the electronic device may receive the article image or article information of the article to be detected and the target attribute information corresponding to the face image sent by the user client. The electronic device may also query and obtain the article image or article information and the target attribute information corresponding to the face image from the user client. If the electronic device obtains an article image, the electronic device may recognize characters contained in the article image by a character recognition technology to obtain the corresponding article information. Then, the electronic device determines the labeled attribute information corresponding to the article to be detected according to the article information. Then, the electronic device determines the target attribute value level corresponding to the user based on the target attribute information, and matches the respective target attribute value levels with the labeled attribute information of the article to be detected. If the matching result shows it is consistent, an article detection result that the article to be detected is suitable for the skin of the user is generated. Otherwise, an article detection result that the article to be detected is not suitable for the user's skin is generated.

In some embodiments, generating an article detection result about whether the article to be detected is suitable for the user based on the target attribute information and the labeled attribute information corresponding to each skin attribute dimension includes the following steps: a matching result between the target attribute information and the labeled attribute information is determined for each skin attribute dimension: when the matching results corresponding to the respective skin attribute dimensions all conform to matching consistency, an article detection result that the article to be detected is suitable for the user is generated: and when at least one matching result corresponding to respective skin attribute dimensions conforms to matching inconsistency, an article detection result that the article to be detected is not suitable for the user is generated.

Specifically, referring to the matching process of the labeled attribute information and attribute value level combination in Step D above, the target attribute value level is matched with labeled attribute information corresponding to respective target attribute information. If the matching result of any skin attribute dimension in the matching result is mutually exclusive, such as at least one 0 in the values of the four dimensions in the matching result of Step D, an article detection result that the article to be detected is not suitable for the user is generated. On the other hand, if the matching results of all skin attribute dimensions in the matching results are the same or compatible, such as the values of all four dimensions in the matching results in Step D are 1, an article detection result that the article to be detected is suitable for the user is generated.

Figure 6:
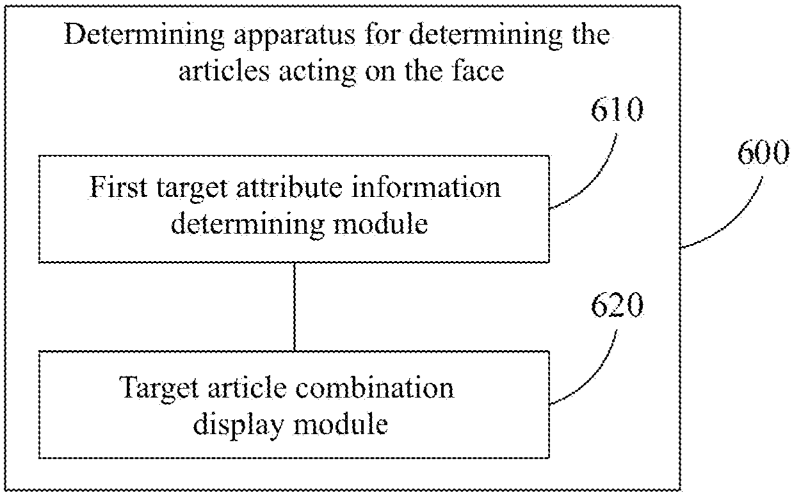
FIG. 6 is a schematic structural diagram of an apparatus for determining the articles acting on the face provided by an embodiment of the present disclosure.

FIG. 6 shows a schematic structural diagram of an apparatus for determining the articles acting on the face provided by an embodiment of the present disclosure. The apparatus for determining the articles acting on the face is configured in the user client 101 in FIG. 1. As shown in FIG. 6, the determining apparatus 600 for determining articles acting on a face may include:

- a first target attribute information determining module 610, configured to determine the target attribute information of the user in the respective skin attribute dimensions based on the face image of the user: and
- a target article combination display module 620, configured to display a target article combination adapted to the user: wherein, the target article combination is determined based on the respective target attribute information and the mapping relationship between the attribute value levels of the respective skin attribute dimensions and the candidate article combinations: and the article combination includes multiple articles that act on the face, and each article belongs to a different article category.

According to the device for determining articles acting on the face in the embodiment of the present disclosure, the user's target attribute information in respective skin attribute dimensions may be determined according to the face image of the user, and the target article combination suitable for the user determined based on the target attribute information and the mapping relationship between the attribute value levels of the respective skin attribute dimensions and the candidate article combinations may be displayed, and the article combination contains a plurality of articles acting on the face, and each article belongs to a different article category. Therefore, the user does not need to combine various articles acting on the face by himself/herself, but the appropriate combination of articles for the face is directly recommended according to the user's skin condition, which not only greatly reduces the difficulty for the user to select articles acting on the face, improves the selection efficiency of the article combination, but also improves the adaptation accuracy of the article combination with the user's skin condition.

In some embodiments, the determining apparatus 600 for determining the articles acting on the face further includes an article detection result display module, which is used for:

- after determining the user's target attribute information on respective skin attribute dimensions based on the face image of the user, obtaining the article information of the article to be detected in response to the user's article detection trigger operation: and displaying the article information of the article to be detected and an article detection result about whether the article to be detected is suitable for the user;

wherein, the article detection result is determined based on the labeled attribute information of respective skin attribute dimensions corresponding to the article information and the target attribute information of the corresponding skin attribute dimension.

In some embodiments, the skin attribute dimensions include a skin smoothness dimension, a skin delicacy dimension, a skin color uniformity dimension and a skin elasticity dimension.

In some embodiments, the first target attribute information determining module 610 is specifically configured to:

when the skin attribute dimension is the skin smoothness dimension, the face image is respectively input into the spot-acne-and-nevus detection model and the blackhead detection model to determine the number of spot-acne-and-nevus and blackheads corresponding to the user;

determine the target attribute information corresponding to the skin smoothness dimension based on the number of spot-acne-and-nevus and blackheads;

or, when the skin attribute dimension is the skin delicacy dimension, input the face image into the blackhead detection model, and determine the number of the blackheads corresponding to the user, and determine the target attribute information corresponding to the skin delicacy dimension based on the number of the blackheads;

or, when the skin attribute dimension is the skin color uniformity dimension, input the face image into the skin color detection model to obtain the skin color difference region in the face image;

determine target attribute information corresponding to the skin color uniformity dimension based on the area of the skin color difference region and the difference between the pixel values of the skin color difference region in the face image and the pixel values of other image regions other than the skin color difference region in the face image;

or, when the skin attribute dimension is the skin elasticity dimension, extract feature points from the face image to obtain face key points in the face image;

determine the eye region, the forehead region and the mouth region in the face image based on key points of the face, and determine the number of the wrinkles in the face image based on the gradient information of pixel values of the eye region, the forehead region and the mouth region: and determine the target attribute information corresponding to the skin elasticity dimension based on the number of the wrinkles.

In some embodiments, the determining apparatus 600 for determining the articles acting on the face further includes a target attribute information display module, which is used for:

after determining the user's target attribute information on respective skin attribute dimensions based on the face image of the user, displaying the respective skin attribute dimensions and the target attribute information of the corresponding skin attribute dimension.

It should be noted that the determining apparatus 600 for determining the articles acting on the face shown in FIG. 6 may perform various steps in the method embodiments shown in FIG. 2 to FIG. 4, and realize various processes and effects in the method embodiments shown in FIG. 2 to FIG. 4, which will not be repeated here.

Figure 7:
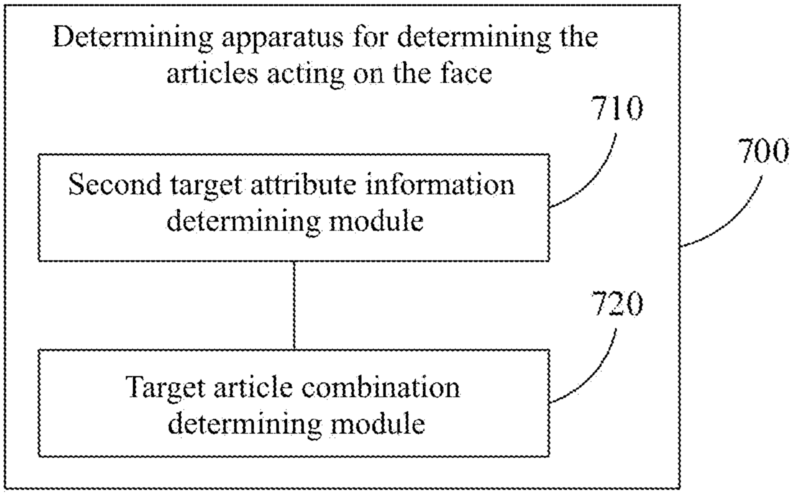
FIG. 7 is a schematic structural diagram of another apparatus for determining the articles acting on the face provided by an embodiment of the present disclosure.

FIG. 7 shows a schematic structural diagram of the determining apparatus for determining the articles acting on the face provided by an embodiment of the present disclosure. The determining apparatus for determining the articles acting on the face is configured in the server 102 in FIG. 1. As shown in FIG. 7, the determining apparatus 700 for determining the articles acting on the face may include:

a second target attribute information determining module 710, configured to determine the target attribute information of the user in respective skin attribute dimensions corresponding to the face image of the user: and a target article combination determination module 720, configured to determine a target article combination suitable for the user based on the target attribute information and the mapping relationship between the attribute value levels of the respective skin attribute dimensions and the candidate article combinations: wherein the article combination includes a plurality of articles acting on the face, and each article belongs to a different article category.

Through the determining apparatus for determining articles acting on the face in the embodiment of the present disclosure, the user's target attribute information in respective skin attribute dimensions may be determined according to the face image of the user, and the target article combination suitable for the user may be determined based on the target attribute information and the mapping relationship between the attribute value levels of the respective skin attribute dimensions and the candidate article combinations, which contains a plurality of articles acting on the face, and each article belongs to a different article category. Therefore, the user does not need to combine various articles acting on the face by himself/herself, but the appropriate combination of articles for the face may be directly recommended according to the user's skin condition, which not only greatly reduces the difficulty for the user to select articles acting on the face, improves the selection efficiency of the article combination, but also improves the adaptation accuracy of the article combination with the user's skin condition.

In some embodiments, the determining apparatus 700 for determining the articles acting on the face further includes a candidate article combination determining module, which is used for determining the candidate article combination in advance by the following ways:

a plurality of attribute value level combinations corresponding to the respective skin attribute dimensions are determined based on the attribute value level of each skin attribute dimension;

for each article acting on the face, the labeled attribute information of the article in respective skin attribute dimensions is matched with each attribute value level combination to obtain the matching degree of the article and each attribute value level combination; and for each attribute value level combination, at least one candidate article combination corresponding to the attribute value level combination is determined based on the article category to which each article belongs and the matching degree between each article and the attribute value level combination.

In some embodiments, the target article combination determination module 720 includes:

a target attribute value level determining sub-module, configured to determine the target attribute value level corresponding to each skin attribute dimension based on the respective target attribute information; and a target article combination screening out sub-module, configured to screen out the target article combination suitable for the user from the candidate article combinations based on the mapping relationship of the target attribute values.

Further, the target article combination screening out sub-module is specifically used for:

querying the mapping relationship based on each target attribute value level, obtaining a plurality of target candidate article combinations corresponding to the respective target attribute value levels; and based on the article provider information of the respective article categories corresponding to the user, screening out the target article combination from the respective target candidate article combinations.

In some embodiments, the determining apparatus 700 for determining the articles acting on the face further includes an article detection result generating module, including:

an article information determining sub-module, configured to determine the article information of the article to be detected after determining the user's target attribute information in respective skin attribute dimensions corresponding to the face image of the user;

a labeled attribute information determining sub-module, configured to determine the labeled attribute information of respective skin attribute dimensions corresponding to the article to be detected based on the article information: and an article detection result generating sub-module, configured to generate the article detection result about whether the article to be detected is suitable for the user based on the target attribute information and the labeled attribute information corresponding to each skin attribute dimension.

Further, the article detection result generating sub-module is specifically used for:

for each skin attribute dimension, determining the matching result between the target attribute information and the labeled attribute information;

when the matching results corresponding to the respective skin attribute dimensions all conform to the matching consistency, generating an article detection result that the article to be detected is suitable for the user: and when at least one matching result corresponding to respective skin attribute dimensions conforms to matching inconsistency, generating the article detection result that the article to be detected is not suitable for the user.

It should be noted that the determining apparatus 700 for determining the articles acting on the face shown in FIG. 7 may perform various steps in the method embodiment shown in FIG. 5, and realize various processes and effects in the method embodiment shown in FIG. 5, which will not be repeated here.

Embodiments of the present disclosure also provide an electronic device, which may include a processor and a memory, and the memory may be used to store executable instructions. Wherein, the processor may be used to read the executable instructions from the memory and execute the executable instructions to realize the method for determining the articles acting on the face in any of the above embodiments.

Figure 8:
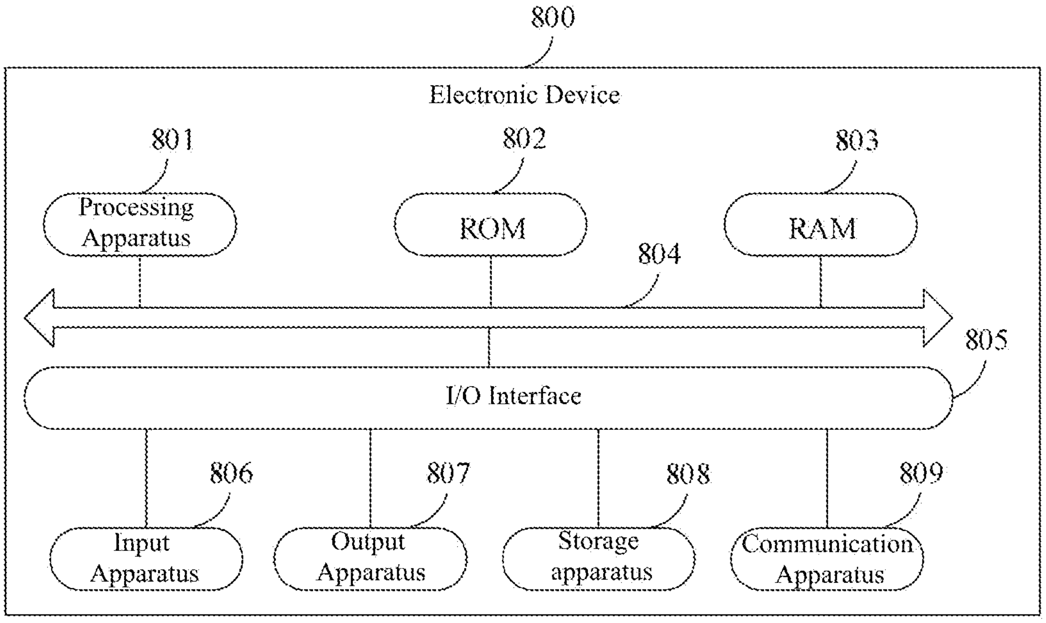
FIG. 8 is a schematic structural diagram of an electronic device provided by an embodiment of the present disclosure.

FIG. 8 shows a schematic structural diagram of an electronic device provided by an embodiment of the present disclosure. It should be noted that the electronic device 800 shown in FIG. 8 is only an example, and should not bring any restrictions on the functions and application scope of the embodiment of the present disclosure.

In some embodiments, when the electronic device 800 performs display related functions, the electronic device 800 may be the terminal device where the user client 101 shown in FIG. 1 is located. In other embodiments, when the electronic device 800 performs related functions such as determining the combination of target items, the electronic device 800 can also be an implementation device of the server 102 shown in FIG. 1.

As shown in FIG. 8, the electronic device 800 may include a processing device (such as a central processing unit, a graphics processor, etc.) 801, which may perform various appropriate actions and processes according to a program stored in a read-only memory (ROM) 802 or a program loaded from a storage device 808 into a random access memory (RAM) 803. In the RAM 803, various programs and data required for the operation of the information processing apparatus 800 are also stored. The processing device 801, the ROM 802 and the RAM 803 are connected to each other through a bus 804. An input/output interface (I/O interface) 805 is also connected to the bus 804.

Generally, the following devices can be connected to the I/O interface 805: an input device 806 including, for example, a touch screen, a touch pad, a keyboard, a mouse, a camera, a microphone, an accelerometer, a gyroscope, etc.: an output device 807 including, for example, a liquid crystal display (LCD), a speaker, a vibrator, etc. Includes a storage device 808 such as a magnetic tape, a hard disk, etc., and a communication device 809. The communication device 809 may allow the electronic device 800 to communicate wirelessly or wired with other devices to exchange data. Although FIG. 8 shows an electronic device 800 with various devices, it should be understood that it is not required to implement or have all the devices shown. More or fewer devices may alternatively be implemented or provided.

The embodiment of the present disclosure also provides a computer-readable storage medium, which stores a computer program, and when the computer program is executed by a processor, the processor is enabled to realize the method for determining an object acting on a face in any embodiment of the present disclosure.

In particular, according to an embodiment of the present disclosure, the process described above with reference to the flowchart can be implemented as a computer software program. For example, an embodiment of the present disclosure includes a computer program product including a computer program carried on a non-transitory computer-readable medium, which contains program code for executing the method shown in the flowchart. In such an embodiment, the computer program can be downloaded and installed from the network through the communication device 809, or installed from the storage device 808, or installed from the ROM 802. When the computer program is executed by the processing device 801, the above-mentioned functions defined in the method for determining an object acting on a face in any embodiment of the present disclosure are executed.

It should be noted that the computer-readable medium mentioned above in this disclosure can be a computer-readable signal medium or a computer-readable storage medium or any combination of the two. The computer-readable storage medium can be, for example, but not limited to, an electrical, magnetic, optical, electromagnetic, infrared, or semiconductor system, device or device, or a combination of any of the above. More specific examples of computer-readable storage media may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In this disclosure, a computer-readable storage medium can be any tangible medium containing or storing a program, which can be used by or in combination with an instruction execution system, apparatus or device. In this disclosure, a computer-readable signal medium may include a data signal propagated in baseband or as part of a carrier wave, in which computer-readable program codes are carried. This propagated data signal can take many forms, including but not limited to electromagnetic signals, optical signals or any suitable combination of the above. A computer-readable signal medium can also be any computer-readable medium other than a computer-readable storage medium, which can send, propagate or transmit a program for use by or in connection with an instruction execution system, apparatus or device. The program code contained in the computer-readable medium can be transmitted by any suitable medium, including but not limited to: wires, optical cables, radio frequency (RF) and the like, or any suitable combination of the above.

In some embodiments, clients and servers can communicate with any currently known or future developed network protocol such as HTTP, and can be interconnected with digital data communication (e.g., communication network) in any form or medium. Examples of communication networks include a local area network ("LAN"), a wide area network ("WAN"), the Internet (for example, the Internet) and end-to-end networks (for example, ad hoc end-to-end networks), as well as any currently known or future developed networks.

The computer-readable medium may be included in the electronic device: or it can exist alone without being assembled into the electronic equipment.

The computer-readable medium carries one or more programs, which, when executed by the electronic device, cause the electronic device to perform the steps of the method for determining an object acting on the face described in any embodiment of the present disclosure.

In an embodiment of the present disclosure, computer program codes for performing the operations of the present disclosure may be written in one or more programming languages or their combinations, including but not limited to object-oriented programming languages such as Java, Smalltalk, C++, and conventional procedural programming languages such as "C" or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of devices, methods and computer program products according to various embodiments of the present disclosure. In this regard, each block in the flowchart or block diagram may represent a module, a program segment, or a part of code that contains one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The units involved in the embodiment described in the present disclosure can be realized by software or hardware. Among them, the name of the unit does not constitute the limitation of the unit itself in some cases.

The functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of this disclosure, a machine-readable medium may be a tangible medium that may contain or store a program for use by or in connection with an instruction execution system, apparatus or device. The machine-readable medium may be a machine-readable signal medium or a machine-readable storage medium. A machine-readable medium may include, but is not limited to, an electronic, magnetic, optical, electromagnetic, infrared, or semiconductor system, device or equipment, or any suitable combination of the above. More specific examples of the machine-readable storage medium may include an electrical connection based on one or more lines, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

The above description is only the preferred embodiment of the present disclosure and the explanation of the applied technical principles. It should be understood by those skilled in the art that the disclosure scope involved in this disclosure is not limited to the technical scheme formed by the specific combination of the above technical features, but also covers other technical schemes formed by any combination of the above technical features or their equivalent features without departing from the above disclosure concept. For example, the above features are replaced with (but not limited to) technical features with similar functions disclosed in this disclosure.

Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure.

Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims.

What is claimed is:

1. A method for determining articles acting on a face, comprising:

determining, by a processor, target attribute information of a user in respective skin attribute dimensions based on a face image of the user;

displaying, by the processor, a target article combination adapted to the user; wherein the target article combination is determined based on the respective target attribute information and a mapping relationship between attribute value levels of the respective skin attribute dimensions and candidate article combinations; wherein the article combination includes a plurality of articles acting on the face, and each article belongs to a different article category; and determining, by the processor, a target article combination suitable for the user based on the respective target attribute information and a mapping relationship between attribute value levels of the respective skin attribute dimensions and candidate article combinations; wherein the article combination includes a plurality of articles acting on the face, and each article belongs to a different article category, wherein the candidate article combination is determined in advance by:

determining, by the processor, a plurality of attribute value level combinations corresponding to the skin attribute dimension based on the attribute value level of the skin attribute dimension;

for each article acting on the face, matching, by the processor, labeled attribute information of the article in respective skin attribute dimensions with each attribute value level combination to obtain a matching degree of the article and each attribute value level combination; and for the attribute value level combination, determining, by the processor, at least one candidate article combination corresponding to the attribute value level combination based on an article category to which the article belongs and the matching degree between the article and the attribute value level combination.

2. The method according to claim 1, wherein after determining the target attribute information of the user in respective skin attribute dimensions based on the face image of the user, the method further comprises:

obtaining article information of an article to be detected in response to an article detection trigger operation of the user; and displaying the article information of the article to be detected and an article detection result about whether the article to be detected is suitable for the user;

wherein the article detection result is determined based on labeled attribute information of respective skin attribute dimensions corresponding to the article information and the target attribute information of the corresponding skin attribute dimension.

3. The method according to claim 1, wherein the skin attribute dimensions include a skin smoothness dimension, a skin delicacy dimension, a skin color uniformity dimension and a skin elasticity dimension.

4. The method according to claim 3, wherein when the skin attribute dimension is the skin smoothness dimension, the determining the target attribute information of the user in respective skin attribute dimensions based on the face image of the user comprises:

respectively inputting the face image into a spot-acne-and-nevus detection model and a blackhead detection model, and determining a number of spot-acne-and-nevus and a number of blackheads corresponding to the user; and determining the target attribute information corresponding to the skin smoothness dimension based on the number of the spot-acne-and-nevus and the number of the blackheads;

wherein, alternatively, when the skin attribute dimension is the skin delicacy dimension, the determining the target attribute information of the user on each skin attribute dimension based on the face image of the user comprises:

inputting the face image into the blackhead detection model, determining the number of the blackheads corresponding to the user, and determining the target attribute information corresponding to the skin delicacy dimension based on the number of the blackheads;

wherein, alternatively, when the skin attribute dimension is the skin color uniformity dimension, the determining the target attribute information of the user on each skin attribute dimension based on the face image of the user comprises:

inputting the face image into a skin color detection model to obtain a skin color difference region in the face image; and determining the target attribute information corresponding to the skin color uniformity dimension based on an area of the skin color difference region and a difference value between a pixel value of the skin color difference region in the face image and a pixel value of other regions other than the skin color difference region in the face image;

wherein, alternatively, when the skin attribute dimension is the skin elasticity dimension, the determining the target attribute information of the user in respective skin attribute dimensions based on the face image of the user comprises:

extracting feature points from the face image to obtain face key points in the face image;

determining an eye region, a forehead region and a mouth region in the face image based on the face key points, and determining a number of the wrinkles in the face image based on pixel value gradient information of the eye region, the forehead region and the mouth region; and determining the target attribute information corresponding to the skin elasticity dimension based on the number of the wrinkles.

5. The method according to claim 1, wherein after determining the target attribute information of the user in respective skin attribute dimensions based on the face image of the user, the method further comprises:

displaying the respective skin attribute dimensions and the target attribute information of the corresponding skin attribute dimension.

6. The method according to claim 1, wherein the determining the target article combination suitable for the user based on the respective target attribute information and the mapping relationship between the attribute value levels of the respective skin attribute dimensions and the candidate article combinations comprises:

determining a target attribute value level corresponding to each skin attribute dimension based on the respective target attribute information; and querying the mapping relationship based on each target attribute value level, and screening out the target article combination suitable for the user from each candidate article combination.

7. The method according to claim 6, wherein the querying the mapping relationship based on each target attribute value level and screening out the target article combination suitable for the user from each candidate article combination comprises:

querying the mapping relationship based on each target attribute value level to obtain a plurality of target candidate article combinations corresponding to the respective target attribute value levels; and screening out the target article combination from the target candidate article combinations based on article provider information in each article category corresponding to the user.

8. The method according to claim 1, wherein after determining target attribute information of a user in respective skin attribute dimensions corresponding to a face image of the user, the method further comprises:

determining the article information of the article to be detected;

determining labeled attribute information of respective skin attribute dimensions corresponding to the article to be detected based on the article information; and generating an article detection result about whether the article to be detected is suitable for the user based on the target attribute information and the labeled attribute information corresponding to each skin attribute dimension.

9. The method according to claim 8, wherein the generating an article detection result about whether the article to be detected is suitable for the user based on the target attribute information and the labeled attribute information corresponding to each skin attribute dimension comprises:

determining a matching result between the target attribute information and the labeled attribute information for each skin attribute dimension;

generating an article detection result that the article to be detected is suitable for the user when the matching results corresponding to respective skin attribute dimensions all conform to matching consistency; and generating an article detection result that the article to be detected is not suitable for the user when at least one matching result corresponding to respective skin attribute dimensions conforms to matching inconsistency.

10. An electronic device, comprising:

a processor; and a memory for storing executable instructions;

wherein the processor is configured to read executable instructions from the memory and executing the executable instructions to realize a method for determining articles acting on a face, comprising:

determining target attribute information of a user in respective skin attribute dimensions based on a face image of the user;

displaying a target article combination adapted to the user; wherein the target article combination is determined based on the respective target attribute information and a mapping relationship between attribute value levels of the respective skin attribute dimensions and candidate article combinations; wherein the article combination includes a plurality of articles acting on the face, and each article belongs to a different article category; and determining a target article combination suitable for the user based on the respective target attribute information and a mapping relationship between attribute value levels of the respective skin attribute dimensions and candidate article combinations; wherein the article combination includes a plurality of articles acting on the face, and each article belongs to a different article category, wherein the candidate article combination is determined in advance by:

determining a plurality of attribute value level combinations corresponding to the skin attribute dimension based on the attribute value level of the skin attribute dimension;

for each article acting on the face, matching labeled attribute information of the article in respective skin attribute dimensions with each attribute value level combination to obtain a matching degree of the article and each attribute value level combination; and for the attribute value level combination, determining at least one candidate article combination corresponding to the attribute value level combination based on an article category to which the article belongs and the matching degree between the article and the attribute value level combination.

11. The electronic device according to claim 10, wherein after determining the target attribute information of the user in respective skin attribute dimensions based on the face image of the user, the method further comprises:

obtaining article information of an article to be detected in response to an article detection trigger operation of the user; and displaying the article information of the article to be detected and an article detection result about whether the article to be detected is suitable for the user;

wherein the article detection result is determined based on labeled attribute information of respective skin attribute dimensions corresponding to the article information and the target attribute information of the corresponding skin attribute dimension.

12. The electronic device according to claim 10, wherein the skin attribute dimensions include a skin smoothness dimension, a skin delicacy dimension, a skin color uniformity dimension and a skin elasticity dimension.

13. The electronic device according to claim 12, wherein when the skin attribute dimension is the skin smoothness dimension, the determining the target attribute information of the user in respective skin attribute dimensions based on the face image of the user comprises:

respectively inputting the face image into a spot-acne-and-nevus detection model and a blackhead detection model, and determining a number of spot-acne-and-nevus and a number of blackheads corresponding to the user; and determining the target attribute information corresponding to the skin smoothness dimension based on the number of the spot-acne-and-nevus and the number of the blackheads;

wherein, alternatively, when the skin attribute dimension is the skin delicacy dimension, the determining the target attribute information of the user on each skin attribute dimension based on the face image of the user comprises:

inputting the face image into the blackhead detection model, determining the number of the blackheads corresponding to the user, and determining the target attribute information corresponding to the skin delicacy dimension based on the number of the blackheads;

wherein, alternatively, when the skin attribute dimension is the skin color uniformity dimension, the determining the target attribute information of the user on each skin attribute dimension based on the face image of the user comprises:

inputting the face image into a skin color detection model to obtain a skin color difference region in the face image; and determining the target attribute information corresponding to the skin color uniformity dimension based on an area of the skin color difference region and a difference value between a pixel value of the skin color difference region in the face image and a pixel value of other regions other than the skin color difference region in the face image;

wherein, alternatively, when the skin attribute dimension is the skin elasticity dimension, the determining the target attribute information of the user in respective skin attribute dimensions based on the face image of the user comprises:

extracting feature points from the face image to obtain face key points in the face image;

determining an eye region, a forehead region and a mouth region in the face image based on the face key points, and determining a number of the wrinkles in the face image based on pixel value gradient information of the eye region, the forehead region and the mouth region; and determining the target attribute information corresponding to the skin elasticity dimension based on the number of the wrinkles.

14. The electronic device according to claim 10, wherein after determining the target attribute information of the user in respective skin attribute dimensions based on the face image of the user, the method further comprises:

displaying the respective skin attribute dimensions and the target attribute information of the corresponding skin attribute dimension.

15. A non-transitory computer program product, wherein the computer program product includes computer programs/instructions which, when executed by a processor, realize a method for determining articles acting on a face, comprising:

determining target attribute information of a user in respective skin attribute dimensions based on a face image of the user;

displaying a target article combination adapted to the user; wherein the target article combination is determined based on the respective target attribute information and a mapping relationship between attribute value levels of the respective skin attribute dimensions and candidate article combinations; wherein the article combination includes a plurality of articles acting on the face, and each article belongs to a different article category; and determining a target article combination suitable for the user based on the respective target attribute information and a mapping relationship between attribute value levels of the respective skin attribute dimensions and candidate article combinations; wherein the article combination includes a plurality of articles acting on the face, and each article belongs to a different article category, wherein the candidate article combination is determined in advance by:

determining a plurality of attribute value level combinations corresponding to the skin attribute dimension based on the attribute value level of the skin attribute dimension;

for each article acting on the face, matching labeled attribute information of the article in respective skin attribute dimensions with each attribute value level combination to obtain a matching degree of the article and each attribute value level combination; and for the attribute value level combination, determining at least one candidate article combination corresponding to the attribute value level combination based on an article category to which the article belongs and the matching degree between the article and the attribute value level combination.

16. The method according to claim 15, wherein the determining the target article combination suitable for the user based on the respective target attribute information and the mapping relationship between the attribute value levels of the respective skin attribute dimensions and the candidate article combinations comprises:

determining a target attribute value level corresponding to each skin attribute dimension based on the respective target attribute information; and querying the mapping relationship based on each target attribute value level, and screening out the target article combination suitable for the user from each candidate article combination.

* * * * *